E. L. HUFF.
CORROSION RESISTANT CONDUIT FITTING.
APPLICATION FILED FEB. 25, 1919.

1,428,374.

Patented Sept. 5, 1922.

INVENTOR
Ernest L. Huff
BY
David C. Davis
ATTORNEY

Patented Sept. 5, 1922.

1,428,374

UNITED STATES PATENT OFFICE.

ERNEST L. HUFF, OF NATRONA, PENNSYLVANIA.

CORROSION-RESISTANT CONDUIT FITTING.

Application filed February 25, 1919. Serial No. 279,143.

*To all whom it may concern:*

Be it known that I, ERNEST L. HUFF, a citizen of the United States, and a resident of Natrona, in the county of Allegheny and State of Pennsylvania, have invented a new and useful Improvement in Corrosion-Resistant Conduit Fittings, of which the following is a specification.

My invention relates to corrosion-resistant conduit fittings and it has for its object to provide apparatus of the character designated that shall be simple and relatively inexpensive in construction and installation and which shall be highly resistant to corrosion, as is present in chemical works and on shipboard.

Figure 1:
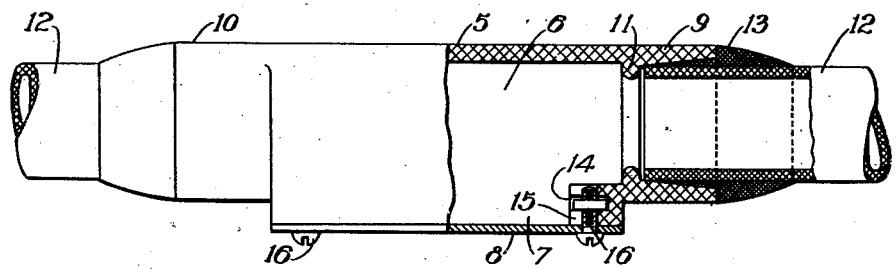
Figures 2, 3:
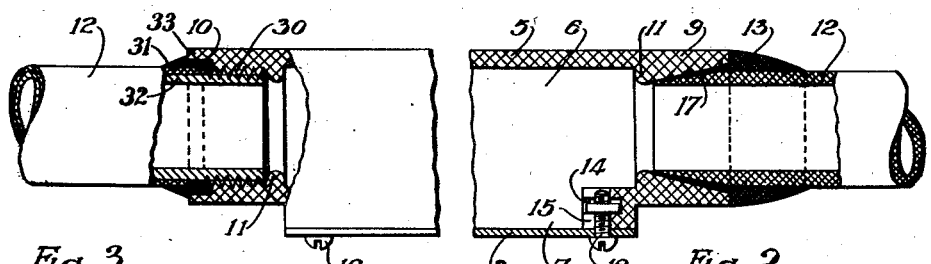
Figure 4:
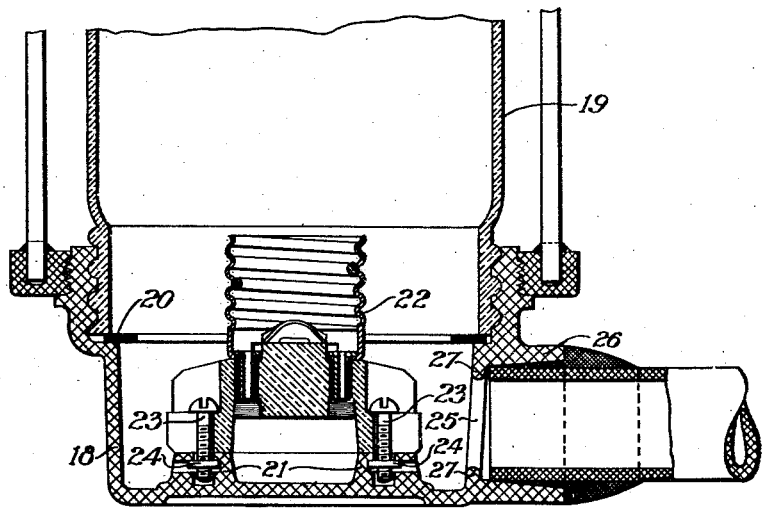

Referring to the accompanying drawing, Fig. 1 is a side view, partially in section and partially in elevation, of a junction or outlet box embodying my invention, together with a portion of a conduit attached thereto; Figs. 2 and 3 are similar views of modifications of the device shown in Fig. 1; and Fig. 4 is a similar view of a vapor proof electric light socket, as is employed on shipboard and the like.

In chemical plants, on shipboard, and in other places where moist corrosive vapors are present, it is well known that the life of the ordinary iron electrical conduit and conduit fittings is radically limited by corrosion, even when the fittings are enameled or sherrardized. Those fittings which by their protection would be adapted for fifteen or twenty years use, under ordinary conditions, must be replaced within three or four years in chemical works, particularly in those places where the fumes of sulphuric or other active acids are constantly present.

I find that fittings of this nature may conveniently be made of an alloy of 90% to 70% lead and 10% to 30% antimony or of alloys of lead with the alkaline earth metals in order to secure great stiffness. The conduit is formed of similar material and is attached thereto by a simple socket joint which is closed, as by burning, soldering or by a wiped joint. Other details of my invention will be hereinafter more fully set forth.

Referring to Fig. 1, I show the body member of an outlet box at 5, this member being preferably formed as a die-casting from any suitable lead alloy, preferably the above-mentioned lead-antimony alloy or lead-alkaline-earth-metal alloy. The member 5 comprises the usual central chamber 6 provided with a main opening 7 closed by a cover plate 8 and further provided with hollow terminal lugs or bells 9 and 10. An inwardly extending flange 11, having a rounded inner edge, is provided within the lug 9, this flange being disposed in position to protect the wire from the end of the conduit 12 that is inserted within the lug 9 and abuts against the flange 11. The conduit 12 is preferably formed of the same material as the box 5, for resistance to corrosion and for mechanical strength, and also that a uniform joint may be formed therebetween. The opening in the bell 9 preferably tapers inwardly to a minimum diameter substantially that of the conduit so as to accurately center and hold the latter during the joining process. The member 12 is joined to the member 9 by burning, soldering or by a wiped joint, as shown at 13, and the fused metal may well be extended within the annular space between the member 9 and the conduit 12, thus providing an exceptionally strong and impervious joint.

The cover member 8 might be joined to the body member 5 by inserting screws in tapped holes in the latter but owing to the soft nature of the metal the threads would soon strip and, accordingly, I may provide small transverse openings, as indicated at 14, in the body of the member 5, and further provide a screw opening 15 traversing the same. For the attachment of the cover member 8, a nut of brass, iron, or other suitable material, may be inserted in the opening 14 and a screw 16 placed through the cover and into engagement therewith. Upon corrosion or other failure of the nut, it may be readily replaced, as will be obvious.

Under certain conditions, it may be found advisable to provide the conduit receiving members 9 with the form of joint shown in Fig. 2. The opening in the member 9 tapers inwardly, forming a conical seat for the conduit and the end of the conduit is correspondingly scarfed, as shown at 17. In this way, an exceedingly smooth and desirable resultant structure is secured, with possibilities of strength substantially the same as those in the form shown in Fig. 1.

I find that threads may be readily formed in the material I employ and in order to still further enhance the strength of the conduit structure, I may tap the conduit receiving bell and form a corresponding thread upon the conduit end, all as shown at 30 in Fig. 3. The threads upon the conduit may be readily formed by rolling. After assembling a conduit and fitting by the coacting threads as shown, the two members may be autogenously joined, as shown in the other forms of my invention, so as to positively exclude corrosive vapors. The simple soldering of the joint, as may be performed by a relatively unskilled worker, forms the equivalent, in strength and tightness, of the burned joints shown in the other figures, these latter requiring a relatively skilled worker for satisfactory results. The fact that adjoining pieces of conduit may be joined by an ordinary wiped or burnt joint permits the use of this construction.

In order to form a conduit structure that shall have even greater mechanical strength, I may employ an iron or steel conduit provided with a lead or lead-alloy coating as shown at 31 and 32 in Fig. 3. The corrosion-resistant coating may be placed upon the ferrous conduit by first pickling the latter and by then subjecting it to a bath of molten lead or lead-alloy or, if a thicker coating is desired, the coating may be forced upon the conduit by an extrusion press, as in the manufacture of the ordinary lead-sheathed cable. The thread at 30 is of sufficient depth to firmly engage the iron of the conduit with the fitting structure.

In order to effectually seal this structure against corrosive vapors, an annular flange or bell 33 is provided of appreciably greater diameter than the conduit and the space between this bell and the conduit is filled as by soldering or burning, thus forming a firm and impervious seal between the material of the fitting and the sheathing of the conduit.

Referring to the form of my invention shown in Fig. 4, a dish-shaped body member 18 is provided with a globe 19 sealed thereto, as by a gasket 20, and as is usual in the art, and the base member 18 is provided with a centrally disposed boss 21 upon which is mounted a lamp socket 22 of usual form. The socket 22 is connected to the boss 21 by screws 23 that preferably engage nuts 24 seated in the boss 21 as are the nuts 14 in the device of Fig. 1.

The body member 18 is further provided with a lateral conduit-receiving opening 25 in the form of an outwardly extending hollow boss 26 having a wire protecting flange 27 at its inner end and adapted for the reception of the conduit as in the other forms of my invention.

In the use of fittings constructed in accordance herewith, the fittings themselves are located and the conduit cut to appropriate length, as with an ordinary saw and the internal burr removed with a knife or similar tool. After scraping, the conduit ends are inserted in the appropriate receiving bosses and attached therein by the simple and effective means illustrated, whereupon a resultant structure is provided that is strong and durable in nature and resistant to acid fumes of all types for long periods of time. By virtue of the lubricating properties of the lead employed, wires may be drawn through conduits of this nature with extreme facility and, furthermore, because of their pliable nature, the conduits may be readily bent to complicated shapes, as is required by close and special wiring, as on shipboard.

Small admixtures of calcium, barium or strontium are found to materially stiffen lead when alloyed therewith and, in certain cases, I may well use an alloy embodying one or more of these alkaline-earth metals in carrying out my invention.

While I have shown my invention in its preferred form, it will be obvious to those skilled in the art that it is not so limited but is susceptible of various minor changes and modifications without departing from the spirit thereof and I desire, therefore, that only such limitations shall be placed thereupon as are imposed by the prior art or are specifically set forth in the appended claims.

I claim as my invention:

1. An electrical conduit fitting constituted largely of lead alloy having materially greater hardness than pure lead.

2. A conduit fitting subject to external corrosion and constituted largely of a lead alloy having materially greater hardness than pure lead.

3. An electrical conduit-fitting constituted largely of an alloy embodying a preponderating proportion of lead and an admixture of antimony.

4. An electrical conduit-fitting constituted largely of an alloy of substantially 90% lead and 10% antimony.

5. The combinattion with an electrical conduit-fitting formed from lead alloy having materially greater hardness than pure lead, of an electrical conduit of like material attached thereto.

6. The combination with a conduit-fitting subject to external corrosion and formed from lead alloy having materially greater hardness than pure lead, of a conduit having a surface of similar nature autogenously attached thereto.

7. The combination with a conduit-fitting subject to external corrosion and formed from an alloy embodying a preponderating proportion of lead and an admixture of antimony, of a conduit of like material attached thereto.

8. The combination with an electrical conduit-fitting formed from an alloy of substantially 90% lead and 10% antimony, of an electrical conduit having a surface of similar nature attached thereto.

9. The combination with an electrical conduit-fitting formed from an alloy embodying a preponderating proportion of lead and an admixture of antimony, of an electrical conduit having a surface of similar nature autogenously attached thereto.

10. The combination with an electrical conduit-fitting formed from an alloy of sub-substantially 90% lead and 10% antimony, of an electrical conduit of like material autogenously attached thereto.

11. The combination with an electrical conduit-fitting formed from a lead alloy having materially greater hardness than pure lead and provided with a wire-admitting opening, of an integral outwardly-extending skirt surrounding said opening, and an electrical conduit having a surface of similar alloy terminating within said skirt and autogenously attached thereto.

12. The combination with a conduit-fitting subject to external corrosion and formed from an alloy of substantially 90% lead and 10% antimony and provided with a wire-admitting opening, of an integral outwardly-extending skirt surrounding said opening, and a conduit having a surface of similar alloy terminating within said skirt and autogenously attached thereto.

In testimony whereof, I have hereunto subscribed my name this 18th day of Feb., 1919.

ERNEST L. HUFF.